United States Patent
Arnell (10) Patent No.: US 9,932,890 B2
(45) Date of Patent: Apr. 3, 2018

(54) DEVICE AND METHOD FOR AUTOMATICALLY ADJUSTING TORQUE TRANSMITTING ABILITY OF A TURBOCOMPOUND TRANSMISSION

(75) Inventor: Jan Arnell, Västra Frölunda (SE)

(73) Assignee: Volvo Lastvagnar AB, Göteborg (SE)

( * ) Notice: Subject to any disclaimer, the term of this patent is extended or adjusted under 35 U.S.C. 154(b) by 0 days.

(21) Appl. No.: 13/120,472

(22) PCT Filed: Oct. 30, 2008

(86) PCT No.: PCT/SE2008/000621
§ 371 (c)(1),
(2), (4) Date: Mar. 23, 2011

(87) PCT Pub. No.: WO2010/050856
PCT Pub. Date: May 6, 2010

(65) Prior Publication Data
US 2011/0196587 A1 Aug. 11, 2011

(51) Int. Cl.
*F16H 61/48* (2006.01)
*F02B 41/10* (2006.01)

(52) U.S. Cl.
CPC ............. *F02B 41/10* (2013.01); *Y02T 10/163* (2013.01)

(58) Field of Classification Search
USPC .......................... 701/30.9; 702/34; 73/114.81
See application file for complete search history.

(56) References Cited

U.S. PATENT DOCUMENTS 3,023,639 A * 3/1962 Hellmut .................. F16D 63/00
475/49
3,805,928 A * 4/1974 Caradot .................. F16D 57/04
137/49

(Continued)

FOREIGN PATENT DOCUMENTS

CN 1720391 A 1/2006
CN 1898463 A 1/2007

(Continued)

OTHER PUBLICATIONS

International Search Report for corresponding International Application PCT/SE2008/000621.

(Continued)

*Primary Examiner* — Jean Paul Cass
(74) *Attorney, Agent, or Firm* — WRB-IP LLP (57) ABSTRACT

A device and method are provided for automatically adjusting torque transmitting ability of a hydrodynamic coupling in a transmission arranged between a power turbine and a crank shaft in a turbocompound combustion engine. The method includes continuously registering a value for one or several of:
a. engine load parameter for the combustion engine and/or,
b. temperature in the combustion engine and/or,
c. parameters for indicating NVH in the transmission;
If parameters a to c have passed a predetermined value for each of the parameters, then braking a power turbine side of the hydrodynamic coupling and continuously adjusting said torque transmitting ability of the hydrodynamic coupling in dependence of the development of the parameters a to c. Increased control of the transmission and engine performance, especially lower noise and exhaust emissions, and accelerated heating of the engine during cold starts, but also better auxiliary braking, can be provided.

15 Claims, 3 Drawing Sheets

(56) References Cited

U.S. PATENT DOCUMENTS

| | | | | |
|---|---|---|---|---|
| 4,114,734 A * | 9/1978 | Bultmann | B60T 1/087 | 188/264 E |
| 4,526,557 A * | 7/1985 | Tanaka | B60W 10/06 | 474/17 |
| 4,882,906 A * | 11/1989 | Sekiyama | B60T 1/08 | 417/364 |
| 5,158,056 A * | 10/1992 | King | F02P 7/067 | 123/192.2 |
| 5,323,612 A | 6/1994 | Werner | | |
| 5,618,242 A * | 4/1997 | Wu | F16H 3/722 | 475/72 |
| 5,884,482 A * | 3/1999 | Lange | F02B 41/10 | 60/624 |
| 5,887,434 A * | 3/1999 | Arnell | F02B 37/105 | 123/561 |
| 5,890,468 A * | 4/1999 | Ozawa | F02B 37/005 | 123/561 |
| 5,894,731 A * | 4/1999 | Håkansson | B60K 31/047 | 60/602 |
| 6,077,190 A * | 6/2000 | Tabata | B60T 8/1755 | 477/169 |
| 6,093,974 A * | 7/2000 | Tabata | B60K 6/365 | 180/65.25 |
| 6,161,641 A * | 12/2000 | Fukumura | B60K 28/16 | 180/197 |
| 6,287,236 B1 * | 9/2001 | Ishikawa | B60T 7/12 | 192/18 A |
| 6,408,626 B1 * | 6/2002 | Arnell | F02B 37/04 | 60/607 |
| 6,412,617 B1 * | 7/2002 | Spijker | F16D 48/06 | 192/103 F |
| 6,487,998 B1 * | 12/2002 | Masberg | B60L 7/003 | 123/192.1 |
| 6,752,133 B2 * | 6/2004 | Arnell | F02F 1/42 | 123/568.12 |
| 6,895,753 B2 * | 5/2005 | Larsson | F01D 11/06 | 60/624 |
| 6,899,209 B2 * | 5/2005 | Holler | F16D 33/06 | 192/3.29 |
| 7,100,370 B2 * | 9/2006 | Klement | B60W 10/02 | 60/357 |
| 7,134,355 B2 * | 11/2006 | Eriksson | B60W 10/02 | 74/329 |
| 7,254,942 B2 * | 8/2007 | Frank | F16D 33/00 | 374/E13.01 |
| 7,475,659 B2 * | 1/2009 | Arnell | F01L 9/02 | 123/90.16 |
| 7,584,608 B2 * | 9/2009 | Pittius | F16D 33/06 | 60/330 |
| 7,681,391 B2 * | 3/2010 | Kley | F16D 33/10 | 60/360 |
| 7,694,519 B2 * | 4/2010 | Kley | F02B 33/34 | 188/274 |
| 7,987,673 B2 * | 8/2011 | Kley | F02B 41/10 | 60/614 |
| 8,191,371 B2 * | 6/2012 | Kley | F02B 33/34 | 60/348 |
| 2002/0052265 A1 * | 5/2002 | Segawa | F16H 61/143 | 477/62 |
| 2003/0060330 A1 * | 3/2003 | Sato | F16H 61/143 | 477/174 |
| 2004/0029682 A1 * | 2/2004 | Sauter | B60K 28/16 | 477/97 |
| 2004/0068986 A1 * | 4/2004 | Friedrich | B60T 1/062 | 60/605.3 |
| 2005/0148478 A1 * | 7/2005 | Ozbalik | C10M 143/06 | 508/591 |
| 2005/0230211 A1 * | 10/2005 | Weilant | F16D 33/02 | 192/21.5 |
| 2006/0173217 A1 * | 8/2006 | Kadkhodayan | C07D 333/48 | 568/32 |
| 2007/0012037 A1 | 1/2007 | Kley | | |
| 2007/0186552 A1 | 8/2007 | Vogelsang et al. | | |
| 2007/0250251 A1 * | 10/2007 | Green, Jr. | F02B 77/085 | 701/105 |
| 2007/0275820 A1 * | 11/2007 | Kley | F02B 41/10 | 477/30 |
| 2008/0017465 A1 * | 1/2008 | Pittius | F16D 33/06 | 192/3.29 |
| 2008/0215255 A1 * | 9/2008 | Stockner | G06F 17/5018 | 702/34 |
| 2009/0149999 A1 * | 6/2009 | Schramm | F16H 57/0006 | 700/280 |
| 2009/0192063 A1 * | 7/2009 | Gray | C10M 163/00 | 508/372 |
| 2009/0250897 A1 * | 10/2009 | Tanouye | B62K 25/286 | 280/284 |
| 2009/0280950 A1 * | 11/2009 | Michishita | B60K 6/34 | 477/3 |
| 2010/0089050 A1 * | 4/2010 | Filla | E02F 9/2292 | 60/433 |
| 2010/0292937 A1 * | 11/2010 | Hosny | F02C 6/12 | 702/34 |
| 2011/0046029 A1 * | 2/2011 | Milner | C10M 137/00 | 508/192 |
| 2011/0126667 A1 * | 6/2011 | Nagahama | F16H 57/0006 | 74/606 R |
| 2011/0315097 A1 * | 12/2011 | Kernchen | B60T 10/02 | 123/41.44 |
| 2012/0077632 A1 * | 3/2012 | Babbitt | B60K 6/12 | 475/1 |

FOREIGN PATENT DOCUMENTS

| | | | | |
|---|---|---|---|---|
| DE | 3224006 | | 12/1983 | |
| DE | 10251620 A1 * | | 5/2004 | ............ F16D 48/06 |
| DE | 10 2005 048 530 A1 * | | 10/2005 | |
| WO | WO 2005040578 A1 * | | 5/2005 | ............ F02B 41/10 |

OTHER PUBLICATIONS

International Preliminary Report on Patentabilty for corresponding International Application PCT/SE2008/000621.
Supplementary European Search Report (dated Mar. 31, 2014) for corresponding European App. EP08877822.
Official Action (dated Apr. 28, 2014) from corresponding Chinese App 200880131586.8.
Indian Examination Report (dated Dec. 5, 2017) for corresponding Indian App. 855/MUMNP/2011.

* cited by examiner

DEVICE AND METHOD FOR AUTOMATICALLY ADJUSTING TORQUE TRANSMITTING ABILITY OF A TURBOCOMPOUND TRANSMISSION

BACKGROUND AND SUMMARY

The present invention relates to a method for controlling the torque transmitting ability of a transmission arranged between a crankshaft of an turbocompound combustion engine and a power turbine of said turbocompound combustion engine.

In particular, the invention will find its application in connection with automotive vehicles, and relates to a method for improved control of said transmission. The invention also relates to a computer program, when run on a computer, computer program product and a storage medium, such as a computer memory.

A turbocompound combustion engine, such as disclosed in for example U.S. Pat. No. 5,884,482, is equipped with a turbocharger turbine arranged for receiving exhaust gas from said combustion engine. Such a turbocompound combustion engine is further equipped with a power turbine arranged for receiving said exhaust gas from said turbocharger turbine. Pressure force from the exhaust gases is transmitted to a crank shaft of the engine via a transmission to be used for vehicle propulsion. Said transmission driven by the power turbine and connected to the crankshaft comprises a hydrodynamic coupling. The hydrodynamic coupling is used in order to avoid transmission of damaging irregular rotation to the power turbine and gearing on the power turbine side of the hydrodynamic coupling. The irregular rotation is the result of the combustions occurring in the different cylinders of the engine during a relatively very short period of time of a turn of the crank shaft. A combustion creates a sudden temporary rotational acceleration of the crank shaft, which has negative exhaustive effect on mechanical parts of the engine. Said hydrodynamic coupling reduces the transmission of said negative effect.

When the combustion engine is turned off and said hydrodynamic coupling is in its off-state and not rotating, part of the coupling can never be fully drained from fluid (oil). This means that when the combustion engine is started and the exhaust pressure in the exhaust pipe has not yet been built up in order to be able to drive the power turbine, the combustion engine will experience an extra resistance in rotation due to the partly filled hydrodynamic coupling transmitting moment of inertia from the inertia of the non-rotating power turbine and the belonging gearing on the power turbine side of the hydrodynamic coupling. Said extra resistance is hard to control and the performance of the combustion engine just after start can be uncertain.

US20040068986 and US2007275820 both disclose a turbocompound arrangement, where a braking device is arranged for braking a power turbine side of a hydrodynamic coupling. US2007275820 mentions that the hydrodynamic coupling can be operated with a partial filling in a braking operation in order to adjust the optimal braking power. Further, here is a cooling device of the hydrodynamic coupling integrated with a combustion engine cooling device. This can be used for transporting heat from the hydrodynamic coupling to the combustion engine at, for example, cold starts.

A technical problem addressed by the present invention is how to provide a more advanced transmission between the power turbine and the crank shaft, which will be able to offer an increased overall combustion engine control.

It is desirable to provide an improved transmission between the power turbine and the crank shaft that will increase the controllability of the hydrodynamic coupling and the power turbine.

Moreover, it is desirable to provide increased control of the transmission between the power turbine and the crank shaft in order to increase the overall performance of the engine, especially for lowering noise and exhaust emissions from the engine, and accelerated heating of the combustion engine during cold starts but also for a better auxiliary braking performance.

Thus, it is desirable to solve the above problems and to provide an improved method for controlling said transmission.

The method according to an aspect of the invention is a method for automatically adjusting torque transmitting ability of a transmission arranged between a power turbine and a crank shaft in a turbocompound combustion engine, said transmission comprising a hydrodynamic coupling, and said method comprising the steps of:

continuously registering a value for one or several of;
a. engine load parameter for said combustion engine and/or,
b. temperature in said combustion engine and/or,
c. parameters for indicating NVH (noise vibration harshness) in said transmission;

if one or several of parameters a to c has passed a predetermined value for each of said parameters in one first direction, then braking a power turbine side of said hydrodynamic coupling and continuously adjusting said torque transmitting ability of said hydrodynamic coupling in dependence of the development of one or several of said parameters a to c.

In one embodiment according to an aspect of the invention said method is characterized in braking said power turbine side of the hydrodynamic coupling to at least a rotational speed below a rotational speed of a turbocompound combustion engine side of the hydrodynamic coupling. In one further embodiment said power turbine side is braked to zero rotational speed.

In a further embodiment according to an aspect of the invention said method is characterized in that continuously adjusting said torque transmitting ability in such a way and until a registered value for each of said one or several parameters a to c has returned back and passed said predetermined value in an opposite direction compared to said first direction.

In another embodiment according to an aspect of the invention said method is characterized in that releasing said braking device when a registered value for each of said one or several parameters a to c has returned back and passed said predetermined value in an opposite direction compared to said first direction.

The invention also relates, in an aspect thereof, to a computer program comprising program code means for performing all the steps of any one of the method claims when said program is run on a computer.

The invention also relates, in an aspect thereof, to a computer program product comprising program code means stored on a computer readable medium for performing all steps of anyone of the method claims when said program product is run on a computer.

The invention also relates, in an aspect thereof to a storage medium, such as a computer memory or a nonvolatile data storage medium, for use in a computing environment, the memory comprising a computer readable program code to perform the method of method claim.

BRIEF DESCRIPTION OF THE DRAWING

The present invention will be described in greater detail below with reference to the accompanying drawings which, for the purpose of exemplification, shows further preferred embodiments of the invention and also the technical background, and in which.

DETAILED DESCRIPTION

Figure 1:
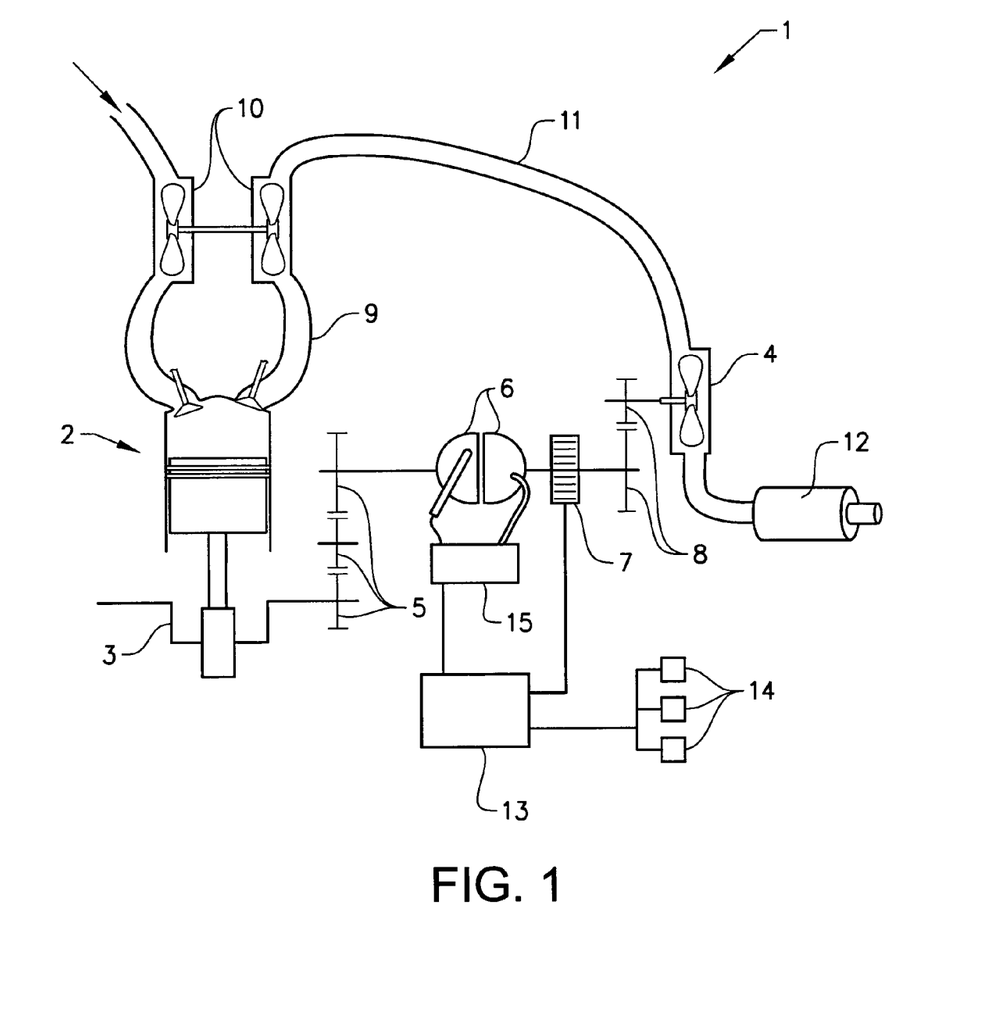
FIG. 1 diagrammatically shows a view of a turbocompound combustion engine according to one embodiment of the invention.

Figure one discloses one example embodiment of the invention, where a turbocompound combustion engine 1 comprises at least one cylinder-piston arrangement 2 connected to a crankshaft 3 in a known manner. The crankshaft can be connected to driven wheels (not shown) of a vehicle (not shown). In the exemplified embodiment of the invention said crankshaft 3 is connected to a power turbine 4, via a transmission comprising a first set of gear wheels 5, a hydrodynamic coupling 6, a braking device 7 and a second set of gear wheels 8. The power turbine 4 can be driven by exhaust gases from the combustion in said cylinder. The exhaust gases are provided to said power turbine 4 via a first exhaust pipe 9, a turbocharger turbine 10 according to known art arranged for receiving exhaust gas from a combustion in said cylinder and for supercharging inlet air to the combustion in said cylinder, and a second exhaust pipe 11. Down stream of said power turbine 4 said exhaust gases can be further processed in an exhaust after treatment system 12 according to known art. The torque transmitting ability of the hydrodynamic coupling and the braking arrangement can be controlled by a control unit 13. Said control unit can be arranged to control said hydrodynamic coupling and the braking arrangement in dependence of different parameters, which can be measured by different sensors 14.

Figure 2:
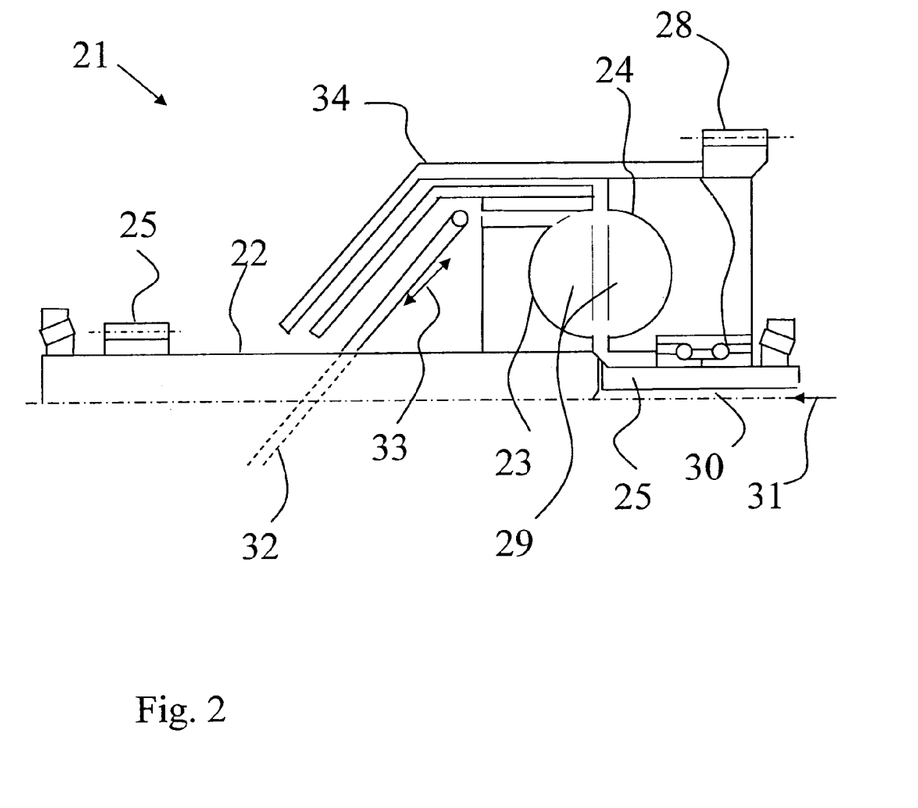
FIG. 2 diagrammatically shows a more detailed view of the transmission arranged between a crankshaft and a power turbine of said turbocompound combustion engine.

FIG. 2 discloses a more detailed exemplified embodiment of said transmission 21 according to the invention. As can be seen two of the three gear wheels in the first gear wheel set 5 are not disclosed in FIG. 2. Only one gear wheel 25 is disclosed. In corresponding way only one gear wheel 28 is disclosed of said second gear wheel set 8. Gear wheel 25 is non-rotatably attached to a shaft 22, which is non-rotatably attached to an engine side of said hydrodynamic coupling 23. A power turbine side of the hydrodynamic coupling 24 is via another shaft 25 non-rotatably connected to said gear wheel 28 and also an outer wall 34 of the hydrodynamic coupling. The gear wheel 28 meshes with a gear wheel connected to said power turbine 4. A space 29 between the two sides of the hydrodynamic coupling can be filled with different volumes of a working fluid (for example oil). The amount of working fluid in said space decides the torque transmitting ability of the hydrodynamic coupling according to known art. The working fluid flows into the hydrodynamic coupling via a channel 30 in said shaft (see arrow 31). The emptying of working fluid is in the exemplified embodiment regulated by a tube 32, which can be positioned in different levels in an axial direction of the tube (indicated by arrows 33) is performed according to known art (see for example GB2182121). Thus, the level of the tube decides the amount of working fluid in said space and, thus, the torque transmitting ability of the hydrodynamic coupling. The braking device 7 disclosed in FIG. 1 (not disclosed in FIG. 2) can be arranged to lock or brake one of the parts fixedly or rotatably connected to the power turbine side of the hydrodynamic coupling. Said brake or lock as such is known art, and can be realized for example via one or several wet couplings or other known braking arrangement. Said parts can be one of or several of the parts between said power turbine side of the hydrodynamic coupling 24 and said power turbine 4. Thus, the braking device, when braking, slows down or hinders the power turbine side of the hydrodynamic coupling from rotating faster that the engine side of the hydrodynamic coupling 6.

The tube 33 can be positioned with a swivel arm (not shown) connected to a lower end (when looking at FIG. 2) of the tube 33. The arm can be driven by, for example, an electric servo motor and controlled by said control unit 13. In this way the torque transmitting ability of said hydrodynamic coupling can be continuously adjustable both when the braking device 7 is active, that is, braking and when said braking device is released.

The working fluid flowing through said hydrodynamic coupling can be part of a closed loop fluid system 15 with connecting pipes and a fluid pump. Said fluid system 15 can also be a part of or integrated with an lubricating system of said turbocompound combustion engine 1. When said fluid is performing work in said hydrodynamic coupling by transmitting torque, friction will give rise to production of heat. This heat can be cooled by a cooling system integrated in said fluid system 15, which cooling system can be a cooling system of the turbocompound combustion engine or a separate hydrodynamic coupling cooling system.

According to one embodiment of the invention said control unit 13 is programmed to automatically adjust the torque transmitting ability of said transmission. The control unit is programmed to continuously register a value for one or several of;

a. engine load parameter for said combustion engine and/or,
b. temperature in said combustion engine and/or,
c. parameters for indicating NVH in said transmission;

If one or several of parameters a to c has passed a predetermined value for each of said parameters in one first direction, then said control unit 13 is programmed to brake a power turbine side of said hydrodynamic coupling and to continuously adjust said torque transmitting ability of said hydrodynamic coupling in dependence of the development of one or several of said parameters a to c.

The engine load parameter can be measured by said sensor 14 in a known way, for example via torque sensor or measuring injected fuel amount in the engine and calculating torque to be produced from the injected fuel amount. According to one embodiment of the invention the control unit can be programmed to brake the power turbine side of said hydrodynamic coupling and to continuously adjust said torque transmitting ability of said hydrodynamic coupling, when registering an engine load value below a predetermined first engine load value, for example corresponding to when the engine is idling. According to the invention said control can be programmed to adjust, the torque transmitting performance (retarding performance when braking device is active) of said hydrodynamic coupling in such a way that the engine will be exposed to an engine load that is at least said predetermined first engine load value. In such engine condition said control unit can be programmed to expose the engine to a load that lies within an interval of which range lies just above said predetermined first engine load value. Noxious emissions produced in a combustion engine during low engine load will be decreased. Thus, when there is enough load from a vehicle travel resistance that will cause an engine load which exceeds said predetermined first engine load value, then said control unit can be programmed to release said braking device, thus the retarding effect from the hydrodynamic coupling will end, and the control unit will regulate the torque transmitting ability of the hydrodynamic coupling to a level which results in a rotational speed of the power turbine that will be optimized for best power turbine efficiency.

In corresponding way and according to another embodiment of the invention said control unit can be programmed to register the temperature of the combustion engine, for example in the cooling system of the combustion engine via a temperature sensor 14, which can also be used in said cooling system of the combustion engine to regulate the cooling performance of said cooling system. According to one embodiment of the invention the control unit can be programmed to brake the power turbine side of said hydrodynamic coupling and to continuously adjust said torque transmitting ability of said hydrodynamic coupling, when registering a temperature value below a predetermined first engine temperature value, for example a value that indicates the limit for a combustion engine cold start. According to the invention said control unit can be programmed to adjust the torque transmitting performance (retarding performance when the braking device is active) of said hydrodynamic coupling in such a way that the engine will be exposed to an increased engine load that will accelerate engine temperature increase so that engine working time during cold start temperatures will decrease. According to one embodiment of the invention the amount of working fluid in said hydrodynamic coupling can be controlled in such a way so that a certain amount of heat will be produced, which for a specific engine and environmental configuration gives a certain temperature rise in said engine. This is beneficial with regard to decreasing noxious emissions produced in a combustion engine. When an engine working temperature above said predetermined first engine temperature value is registered then said control unit is programmed to release said braking device and said hydrodynamic, coupling will be controlled as to maximize efficiency of said power turbine.

In corresponding way and according to a further embodiment of the invention said control unit can be programmed to register said parameters for indicating NVH in said transmission (especially NVH in gear wheels 5). Said parameters for indicating NVH can for example be a combination of amount of injected fuel in the combustion engine and combustion engine rotational speed (a combustion engine rotational speed map). NVH, is most likely to occur during idle rotational speed of said combustion engine in combination with low load on the combustion engine. According to the invention said control can be programmed to adjust the torque transmitting performance (retarding performance when the braking device is active) of said hydrodynamic coupling in such a way that the engine will be exposed to an slightly increased engine load that will tighten the transmission between the crank shaft and the braking device and, thus, no NVH will occur between the gear wheels 5. The benefit of this is that noise emissions from said transmission will decrease. When the control unit is registering that engine load and rotational speed is above predetermined values, said control unit is programmed to release said braking device and said hydrodynamic coupling will be controlled as to maximize efficiency of said power turbine.

Methods for cylinder balancing or correction of amount of injected fuel in each cylinder in relation to injected fuel amount in the other cylinders is something that is well known in the art. The registration of NVH as described above can be a measure of how well the balancing of fuel amount between the cylinders has been performed. Irregularities between the cylinders can create noise from rattling gear wheels such as gear wheels 5.

As mentioned above said control unit can be arranged to control said hydrodynamic coupling and the braking arrangement in dependence of each of said mentioned parameters, which can be measured by different sensors 14. According to one embodiment of the invention said control unit 13 can be programmed to register a value for two or several of said three parameters and control said hydrodynamic coupling and said braking arrangement in dependence of the development of those parameters.

Now an embodiment will be described where said hydrodynamic coupling is, used as an auxiliary vehicle brake, which completes the braking power of an, for example, engine, compression brake (not showed) arranged in said turbocompound combustion engine 1. When, for example, engine compression braking or other auxiliary braking is demanded or will be demanded, then according to one embodiment of the invention said control unit 13 can be programmed to activate said braking device 7 and fill said hydrodynamic coupling so that an additional braking power will be transmitted to driven wheels of the vehicle. The braking power of an engine compression brake according to known art is dependent of rotational speed of the combustion engine 1. Said compression brake produces more braking power at high rotational speeds compared to low rotational speeds. Thus, the use of said hydrodynamic coupling as an auxiliary brake is especially beneficial at low engine rotational speeds. The braking power produced by said hydrodynamic coupling auxiliary brake can be controlled by varying the filling level of said hydrodynamic coupling and/or by varying braking power from the braking device 7. This can be done in dependence of, for example, at least demanded vehicle speed.

According to one embodiment when said hydrodynamic coupling is used as an auxiliary brake said control unit can be programmed to only activate said hydrodynamic coupling auxiliary brake during a gearshift of a gearbox arranged between said combustion engine 1 and said driven wheels. During a gearshift output torque from the engine is decreased to around zero. This means also that exhaust gas pressure is decreased substantially and said turbine 4 will be substantially relieved from driving force from the exhaust gases. When there is none or almost no driving force on the power turbine 4 it is easier to decrease the turbine side (4 and 8) to zero rotational speed with said braking device 7 and stress on the power turbine 4 and said second gear wheel set 8 will be minimized during the retardation of said turbine side.

In another embodiment said hydrodynamic coupling auxiliary brake can be activated during a decrease of combustion engine output torque without a gearshift. This will also decrease driving force on the power turbine from said exhaust gas pressure. Said decrease of engine output torque can be an output torque decrease due to ordinary engine control or engine control due to demanded auxiliary braking power.

In an further embodiment said hydrodynamic coupling auxiliary brake can be activated only during when the exhaust gas flow bypasses said power turbine. This can be done by a bypassing conduit (not shown) connecting the second exhaust pipe 11 with the aftertreatment system 12. The exhaust flow through said bypass conduit can be controlled by said control unit 13 through a valve arranged in said bypass conduit according to known art. This will also substantially decrease exhaust gas pressure driving said power turbine and stress on the power turbine 4 and said second gear wheel set 8 will be minimized during the retardation of said turbine side.

When the hydrodynamic coupling auxiliary brake is to be deactivated, that is the braking device 7 is released, and said power turbine is accelerated by the exhaust gas pressure said control unit can be programmed to control the filling level of said hydrodynamic coupling (that is torque transmitting ability of said hydrodynamic coupling) so that overspeed of said power turbine 4 is avoided.

In a further embodiment said hydrodynamic coupling can be used alone as an auxiliary brake, that is without additional braking power from other auxiliary brakes such as an engine compression brake.

When the braking device 7 in all the above mentioned embodiments is said to brake the turbine side of the hydrodynamic coupling, the amount of braking power must be so that rotational speed of the turbine side of the hydrodynamic coupling drops below the rotational speed of the engine side of the hydrodynamic coupling in order to gain the mentioned beneficial effects of the different embodiments of the invention. The most powerful beneficial effect of the different embodiments of the invention will usually occur when the power turbine side of the hydrodynamic coupling is braked to zero rotational speed. Thus, if possible said control unit 13 can be programmed to brake said power turbine side to zero rotational speed in all above mentioned embodiments of the invention. Thus, in such an embodiment the only regulation of the retarding performance of the hydrodynamic coupling will be performed by regulating the torque transmitting ability of the hydrodynamic coupling 6.

Figure 3:
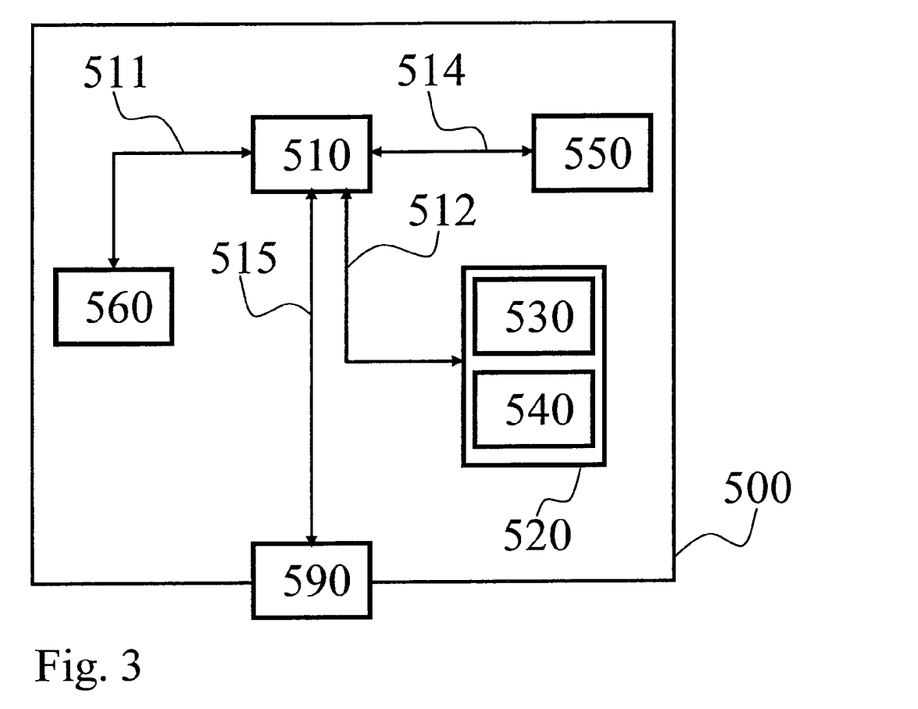
FIG. 3 discloses a computer arrangement for controlling said transmission according to then invention.

FIG. 3 shows an apparatus 500 according to one embodiment of the invention, comprising a nonvolatile memory 520, a processor 510 and a read and write memory 560. The memory 520 has a first memory part 530, in which a computer program for controlling the apparatus 500 is stored. The computer program in the memory part 530 for controlling the apparatus 500 can be an operating system.

The apparatus 500 can be enclosed in, for example, a control unit, such as the control unit 13. The data-processing unit 510 can comprise, for example, a microcomputer.

The memory 520 also has a second memory part 540, in which a program for controlling the transmission according to the invention is stored. In an alternative embodiment, the program for controlling the transmission is stored in a separate nonvolatile data storage medium 550, such as, for example, a CD or an exchangeable semiconductor memory. The program can be stored in an executable form, or in a compressed state.

When it is stated below that the data-processing unit 510 runs a specific function, it should be clear that the data-processing unit 510 is running a specific part of the program stored in the memory 540 or a specific part of the program stored in the nonvolatile recording medium 550.

The data-processing unit 510 is tailored for communication with the memory 550 through a data bus 514. The data-processing unit 510 is also tailored for communication with the memory 520 through a data bus 512. In addition, the data-processing unit 510 is tailored for communication with the memory 560 through a data bus 511. The data-processing unit 510 is also tailored for communication with a data port 590 by the use of a data bus 515.

The method according to the present invention can be executed by the data-processing unit 510, by the data-processing unit 510 running the program stored in the memory 540 or the program stored in the nonvolatile recording medium 550.

The invention should not be deemed to be limited to the embodiments described above, but rather a number of further variants and modifications are conceivable within the scope of the following patent claims.

The invention claimed is:

1. A method for automatically adjusting torque transmitting ability of a transmission arranged between a power turbine and a crankshaft in a turbocompound combustion engine, the transmission comprising a hydrodynamic coupling, and the method comprising:
   continuously registering, via a controller, a value for at least one parameter among a plurality of parameters comprising:
   a. an engine load for the combustion engine,
   b. temperature in the combustion engine, and
   c. noise and vibration in the transmission;
   determining, via the controller, that a registered value for the at least one parameter has passed a respective predetermined value for the at least one parameter in one first direction;
   braking a power turbine side of the hydrodynamic coupling arranged between the power turbine and the crankshaft and continuously adjusting torque transmitting ability of the hydrodynamic coupling as a function of development of the registered value for the at least one parameter to automatically adjust the torque transmitting ability of the transmission after determining that the registered value for the at least one parameter has passed the respective predetermined value for the at least one parameter in the one first direction, and
   continuously registering, via the controller, engine load for the combustion engine, determining, via the controller, that the registered engine load is below a predetermined first engine load value, and braking the power turbine side of the hydrodynamic coupling and continuously adjusting the torque transmitting ability of the hydrodynamic coupling so that the engine is exposed to an increased load, including a load of the braked hydrodynamic coupling transmitted through the hydrodynamic coupling, above the first engine load value after determining that the registered engine load is below the predetermined first engine load value.

2. The method as claimed in claim 1, comprising braking the power turbine side of the hydrodynamic coupling to at least a rotational speed below a rotational speed of a turbocompound combustion engine side of the hydrodynamic coupling.

3. The method as claimed in claim 2, comprising braking the power turbine side to zero rotational speed.

4. The method as claimed in claim 2, comprising continuously adjusting the torque transmitting ability in such a way and until a registered value fore the respective one of parameters a to c has returned back and passed the predetermined value in an opposite direction compared to the first direction.

5. The method as claimed in the claim 4, comprising releasing the braking device when a registered value for the respective one of the parameters a to c has returned back and passed the predetermined value in an opposite direction compared to the first direction.

6. A computer programmed with program code for performing a method for automatically adjusting torque transmitting ability of a transmission arranged between a power turbine and a crankshaft in a turbocompound combustion engine, the transmission comprising a hydrodynamic coupling, and the method comprising:
  continuously registering, via a controller, a value for at least one parameter among a plurality of parameters comprising:
  a. an engine load for the combustion engine,
  b. temperature in the combustion engine, and
  c. noise and vibration in the transmission;
  determining, via the controller, that a registered value for the at least one parameter has passed a respective predetermined value for the at least one parameter in one first direction;
  braking a power turbine side of the hydrodynamic coupling arranged between the power turbine and the crankshaft and continuously adjusting torque transmitting ability of the hydrodynamic coupling as a function of development of the registered value for the at least one parameter to automatically adjust the torque transmitting ability of the transmission after determining that the registered value for the at least one parameter has passed the respective predetermined value for the at least one parameter in the one first direction, and
  continuously registering, via the controller, engine load for the combustion engine, determining, via the controller, that the registered engine load is below a predetermined first engine load value, and braking the power turbine side of the hydrodynamic coupling and continuously adjusting the torque transmitting ability of the hydrodynamic coupling so that the engine is exposed to an increased load, including a load of the braked hydrodynamic coupling transmitted through the hydrodynamic coupling, above the first engine load value after determining that the registered engine load is below the predetermined first engine load value.

7. A non-transitory computer program product comprising program code stored on a computer readable medium for performing a method for automatically adjusting torque transmitting ability of a transmission arranged between a power turbine and a crankshaft in a turbocompound combustion engine, the transmission comprising a hydrodynamic coupling, and the method comprising:
  continuously registering, via a controller, a value for at least one parameter among a plurality of parameters comprising:
  a. an engine load for the combustion engine,
  b. temperature in the combustion engine, and
  c. noise and vibration in the transmission;
  determining, via the controller, that a registered value for the at least one parameter has passed a respective predetermined value for the at least one parameter in one first direction;
  braking a power turbine side of the hydrodynamic coupling arranged between the power turbine and the crankshaft and continuously adjusting torque transmitting ability of the hydrodynamic coupling as a function of development of the registered value for the at least one parameter to automatically adjust the torque transmitting ability of the transmission after determining that the registered value for the at least one parameter has passed the respective predetermined value for the at least one parameter in the one first direction, and
  continuously registering, via the controller, engine load for the combustion engine, determining, via the controller, that the registered engine load is below a predetermined first engine load value, and braking the power turbine side of the hydrodynamic coupling and continuously adjusting the torque transmitting ability of the hydrodynamic coupling so that the engine is exposed to an increased load, including a load of the braked hydrodynamic coupling transmitted through the hydrodynamic coupling, above the first engine load value after determining that the registered engine load is below the predetermined first engine load value.

8. A non-transitory storage medium comprising a computer readable program code to perform a method for automatically adjusting torque transmitting ability of a transmission arranged between a power turbine and a crankshaft in a turbocompound combustion engine, the transmission comprising a hydrodynamic coupling, and the method comprising:
  continuously registering, via a controller, a value for at least one parameter among a plurality of parameters comprising:
  a. an engine load for the combustion engine,
  b. temperature in the combustion engine, and
  c. noise and vibration in the transmission;
  determining, via the controller, that a registered value for the at least one parameter has passed a respective predetermined value for the at least one parameter in one first direction;
  braking a power turbine side of the hydrodynamic coupling arranged between the power turbine and the crankshaft and continuously adjusting torque transmitting ability of the hydrodynamic coupling as a function of development of the registered value for the at least one parameter to automatically adjust the torque transmitting ability of the transmission after determining that the registered value for the at least one parameter has passed the respective predetermined value for the at least one parameter in the one first direction, and
  continuously registering, via the controller, engine load for the combustion engine, determining, via the controller, that the registered engine load is below a predetermined first engine load value, and braking the power turbine side of the hydrodynamic coupling and continuously adjusting the torque transmitting ability of the hydrodynamic coupling so that the engine is exposed to an increased load, including a load of the braked hydrodynamic coupling transmitted through the hydrodynamic coupling, above the first engine load value after determining that the registered engine load is below the predetermined first engine load value.

9. The method as claimed in claim 1, comprising continuously registering a value for each of the parameters a to c.

10. A method for automatically adjusting torque transmitting ability of a transmission arranged between a power turbine and a crankshaft in a turbocompound combustion engine, the transmission comprising a hydrodynamic coupling, and the method comprising:
  continuously registering, via a controller, a value for at least one parameter among a plurality of parameters comprising:
  a. an engine load for the combustion engine;
  b. temperature in the combustion engine, and
  c. noise and vibration in the transmission;

determining, via the controller, that a registered value for the at least one parameter has passed a respective predetermined value for the at least one parameter in one first direction;

braking a power turbine side of the hydrodynamic coupling arranged between the power turbine and the crankshaft aid continuously adjusting torque transmitting ability of the hydrodynamic coupling as a function of development of the registered value for the at least one parameter to automatically adjust the torque transmitting ability of the transmission after determining that the registered value for the at least one parameter has passed the respective predetermined value for the at least one parameter in the one first direction, and continuously registering, via the controller, engine temperature for the combustion engine is continuously registered, determining, via the controller, that the registered engine temperature is below a predetermined first engine temperature value, and braking the power turbine side of the hydrodynamic coupling and continuously adjusting the torque transmitting ability of the hydrodynamic coupling so that the engine is exposed to an increased load, including a load of the braked hydrodynamic coupling transmitted through the hydrodynamic coupling, sufficient to accelerate engine temperature so that engine heating to a temperature above the first engine temperature value is achieved more quickly than if no braking of the power turbine side of the hydrodynamic coupling and adjustment of the of the torque transmitting ability of the hydrodynamic coupling were performed after determining that the registered engine temperature is below the predetermined first engine temperature value.

11. The method as claimed in claim 1, comprising continuously registering, via the controller, noise and vibration in the transmission, determining, via the controller, that the registered noise and vibration is above a predetermined noise and vibration value, and braking the power turbine side of the hydrodynamic coupling and continuously adjusting the torque transmitting ability of the hydrodynamic coupling so that transmission through the hydrodynamic coupling is tightened sufficiently to reduce noise and vibration from the transmission achieve noise and vibration values below the first noise and vibration value after determining that the registered noise and vibration is above the predetermined first engine load value.

12. The method as claimed in claim 1, wherein braking the power turbine side of the hydrodynamic coupling increases engine load.

13. The method as claimed in claim 1, wherein braking of the power turbine side of the hydrodynamic coupling occurs when the engine is idling.

14. The method as claimed in claim 1, wherein braking of the power turbine side of the hydrodynamic coupling is terminated when a registered engine load exceeds a predetermined engine load value.

15. A method for automatically adjusting torque transmitting ability of a transmission arranged between a power turbine and a crankshaft in a turbo compound combustion engine, the transmission comprising a hydrodynamic coupling, and the method comprising:

continuously registering, via a controller, a value for at least one parameter among a plurality of parameters comprising:
a. an engine load for the combustion engine,
b. temperature in the combustion engine, and
c. noise and vibration in the transmission;

determining, via the controller, that a registered value for the at least one parameter has passed a respective predetermined value for the at least one parameter in one first direction; and braking a power turbine side of the hydrodynamic coupling arranged between the power turbine and the crankshaft and continuously adjusting torque transmitting ability of the hydrodynamic coupling as a function of development of the registered value for the at least one parameter to automatically adjust the torque transmitting ability of the transmission after determining that the registered value for the at least one parameter has passed the respective predetermined value for the at least one parameter in the one first direction, wherein braking of the power turbine side of the hydrodynamic coupling is terminated when a registered engine working temperature exceeds a predetermined engine temperature value.

* * * * *